United States Patent [19]
Dorner

[11] Patent Number: 4,833,388
[45] Date of Patent: May 23, 1989

[54] METHOD OF AND ARRANGEMENT FOR CONTROLLING AN ASYNCHRONOUS MOTOR

[75] Inventor: Karlheinz Dorner, Karlsfeld, Fed. Rep. of Germany

[73] Assignee: Hans Heynau GmbH, Munich, Fed. Rep. of Germany

[21] Appl. No.: 852,585

[22] Filed: Apr. 16, 1986

[30] Foreign Application Priority Data

Apr. 16, 1985 [DE] Fed. Rep. of Germany ....... 3513510

[51] Int. Cl.$^4$ .............................................. H02P 5/40
[52] U.S. Cl. .................................... 318/800; 318/808
[58] Field of Search ................. 318/800, 803, 807–811

[56] References Cited
U.S. PATENT DOCUMENTS 4,310,791 1/1982 Akamatsu .
4,319,298 3/1982 Davis et al. ........................... 361/24
4,456,868 6/1984 Yamamura et al. ................. 318/800
4,461,986 7/1984 Maynard et al. .
4,494,204 1/1985 Hösel .

OTHER PUBLICATIONS

Sen et al, "Induction Motor Drives with Microcomputer Control System", IAS Annual Meeting, 1980 Cincinnati, OH, USA Sep. 28, Oct. 3, 1980, pp. 653–662.
Patent Abstracts of Japan, Band 5, Nr. 137, (E-72) [809], Aug. 29, 1981, JP-A-5671486, (Tokyo Shbaura Denki K.K.) 06-15-1981.
IEEE Transactions on Industrial Electronics and Control Instrumentation, Band IEC1-28, Nr. 1, Feb. 1981, Seitan 17–21, N.Y., U.S.A., "Microprocessor Control".

Primary Examiner—David Smith, Jr.
Attorney, Agent, or Firm—Spencer & Frank

[57] ABSTRACT

A method and an arrangement for controlling an asynchronous motor fed via a frequency converter. The control is accomplished with a model implemented in a microcomputer which is provided with data derived from the characteristics of the motor set forth on the rating-plate of the asynchronous motor along with data derived directly from the operating characteristics.

6 Claims, 3 Drawing Sheets

METHOD OF AND ARRANGEMENT FOR CONTROLLING AN ASYNCHRONOUS MOTOR

BACKGROUND OF THE INVENTION

The background of the invention will be discussed in two parts.

FIELD OF THE INVENTION

The present invention relates to motor control systems, and more particularly to a method and arrangement for controlling an asynchronous motor which is fed by means of a frequency converter.

DESCRIPTION OF THE PRIOR ART

In a thesis paper, a method of controlling an asynchronous motor is described, such thesis paper being prepared by Henning Klickow, Braunschweig TU, entitled: "Tntwicklung and Vergleich von Verfahren zur Regelung von Asynchronmaschinen unter Verwendung eines Mikrorechners".

In the paper, there is described a method of controlling an asynchronous motor which is fed via a frequency converter and wherein a primary-current vector is formed from two components one of which determines only the torque, and the other component of which determines only the magnetic flux. In accordance with the method, a field angle is derived from the slip frequency and added to the rotor rotation angle to obtain a sum angle. For controlling the current supplied to the converter, a stator-current vector is calculated from the two current components and the sum angle, whereupon the field angle is derived by time-discrete summation of a quantity $\omega_2$ proportional to the slip frequency. Thereafter, the magnetizing current $|i_{mR}|$, the torque-determining current component $i_q$, and the quantity $\omega_2$, which is proportional to the slip frequency, are formed from predeterminable control quantities for the torque and the flux.

As set forth in the paper, the calculations are performed in accordance with the following equations, which contain a few of the parameters:

$$i_d = (L_R/R_R) d/dt(|i_{mR}|) + (|i_{mR}|) \qquad (1)$$

$$M_a/K = |i_{mR}| * i_q \qquad (2)$$

$$i_q = \omega_2 (L_R/R_R) * (|i_{mR}|) \qquad (3)$$

where:
  $i_d$ is the magnetizing current component;
  $L_R/R_R$ is the rotor time constant;
  $|i_{mR}|$ is the magnetizing current;
  $M_a$ is a torque command;
  K is a motor-dependent constant;
  $i_q$ is the torque determining current component; and
  $\omega_2$ is a quantity proportional to slip frequency.

The thesis paper above referenced does not disclose how the various parameters are to be generated. For the proper operation of an asynchronous motor, however, it is necessary that some means be provided for utilizing these parameters as part of the control, preferably to the frequency converter feeding the asynchronous motor.

It is therefore an object of the invention to provide a method by which these parameters can be utilized in conjunction with the frequency converter for effecting control of the asynchronous motor.

SUMMARY OF THE INVENTION

In accordance with the invention, the motor-dependent data given on the rating plate is utilized as a basis for deriving the necessary information for inputting and computing the parameters required for asynchronous motor operation. The data on the motor rating plate includes the rated current $i_n$, the cosine $\phi$, and the rated speed $n_n$. Utilizing the motor characteristic data as an initial data base, other paramters are computationally derived therefrom, with a control unit, which also receives signals from a pulse generator coupled for rotation with the rotor of the motor, the output of the control unit controlling the frequency generator for control of the asynchronous motor.

Other objects, features and advantages of the invention will become apparent from a reading of the specification, when taken in conjunction with the drawings, in which like reference characters refer to like elements in the several views.

DESCRIPTION OF THE PREFERRED EMBODIMENT

Figure 1:
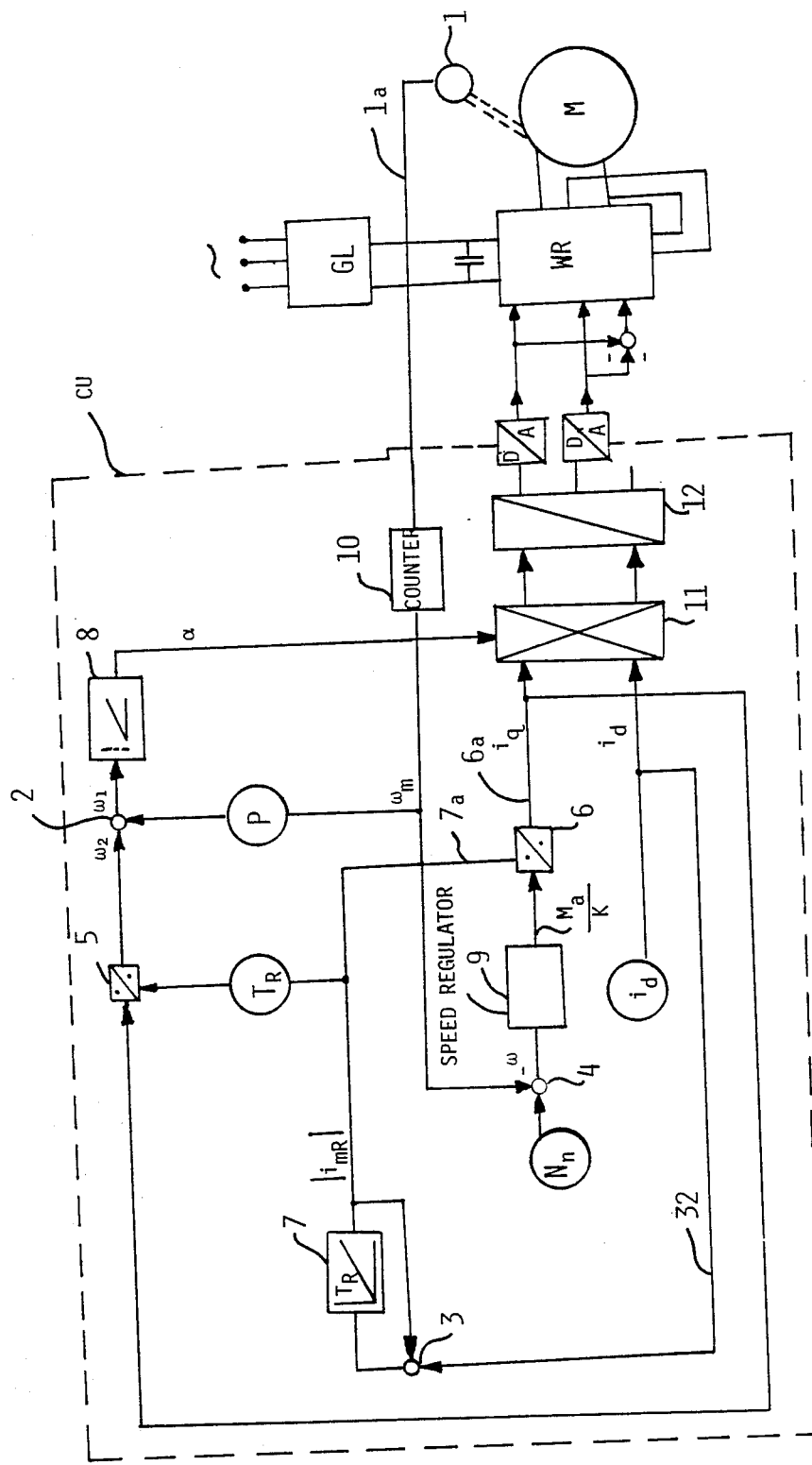
FIG. 1 is a schematic diagram of an arrangement for controlling the asynchronous motor fed via a frequency converter.

In accordance with an aspect of the present invention, the equations set forth in the thesis paper, coupled with motor specific data derivable from the rating plate of the motor establish a basis for control of an asynchronous motor which is fed from a frequency converter.

In addition to the parameters set forth in the equations, certain other motor parameters are required to effect the control.

The equations taken from the thesis paper are as follows:

$$i_d = (L_R/R_R) d/dt(|i_{mR}|) + (|i_{mR}|) \qquad (1)$$

$$M_a/K = |i_{mR}| * i_q \qquad (2)$$

$$i_q = \omega_2 (L_R/R_R) * (|i_{mR}|) \qquad (3)$$

Of the above terms, those parameters which are motor operating parameters are:
  1. the rotor time constant $T_R = L_R/R_R$
  2. the magnetizing-current component $i_d$
  3. a constant K.

The constant K in the above equation is an idealized constant, which is unknown, and which varies somewhat from motor to motor within a group of motors of the same manufacture and same rating. The data on the motor rating plate, while not containing the constant K, contains information pertaining to rated current, rated speed, and the cosine, which data is known, and which data is representative of the actual motor to be controlled.

The quantity $\omega_2$, in the above equations is proportional to slip speed, but such data is not contained on the rating plate, although required for application of the equations. However, since commercially available three-phase motors have a maximum rated slip of less than 10%, the number of pole pairs and, thus, the motor's rated sklip $\omega_{2N}$ can be determined directly from the rated speed.

For the rated operation of the unregulated three-phase motor, characterized here by the additional subscript N, equation (3) can be written as follows:

$$\omega_{2N} = 1/T_R(i_{qN}/i_{dN}),$$

where the torque determining current component $i_qN$, the magnetizing current component $i_dN$ and the rotor time constant $T_R$ are unknown quantities.

Assuming that $K_1 = i_{qN}/i_{dN}$ repesents a motor-dependent constant, the rotor time constant, $T_R$, can be determined in a simple manner by the equation $$T_R = K_1 * 1/\omega_{2N} \qquad \text{(equation X)}$$

However, since $K_1$ is actually a motor-specific but unknown quantity, some means must be derived for providing a constant more representative of the constant of the actual motor to be controlled. For this purpose, a mean value $\overline{K}_1$, is determined empirically from the operation of different motors of a group of like motors, and this mean value is then substituted for the unknown value $K_1$ of the respective motor. This preset mean value $\overline{K}_1$ may differ from the actual value $K_1$ of the motor, but with the parameter $T_R$ determined in this manner, very good results have already being achieved with a great number of different motors.

Higher accuracy in determining the rotor time constant $T_R$ is achieved if the value $K_1$ used in equation X is adjusted by approximation to the mean value $\overline{K}_1$ of the motor by suitably evaluating the entered cosine $\phi$ of the motor. To do this, the arithmetic unit of the control unit obtains an adjusted mean value $\overline{K}_1$ from an empirically determined look-up table depending on the entered cosine $\phi$, and utilizes this value in the control unit. The empirically determined look-up table is also adapted to compensate for the power output of the inverter controlled by the control unit. By way of example, in the derivation of values for the look-up table, with a given power output of the inverter, a number of different motors of the same class of motor are connected to a tes bed, in which the only equipment which is changing is the motor. The cosine data from the rating plate is correlated to the computed constant $K_1$ within the table, and this table forms the base for the look-up table for this class of motors for this power output of the inverter used. Thus, with another motor, with entry of the cosine data, a "K"-value for that specific motor may be derived from the look-up table.

The magnetizing-current component $i_d$ is derived from the rated current and the cosine of the motor according to the equation $$i_d = K_2 * I_N * \sin \phi,$$

where $K_2$ is a constant from the look-up table, serving to adjust to the output of the converter. Sin $\phi$ in the above equation may of course be calculated from the entered cos $\phi$.

In accordance with the invention, a major advantage is that the user can connect any asynchronous motor to the control system without having any detailed knowledge of the control unit.

The application of the above method may be more readily comprehended by reference to the drawings, and particularly to FIG. 1, in which there is shown a schematic diagram, which illustrates an arrangement for controlling an asynchronous motor, e.g., a three-phase asynchronous motor, fed via a frequency converter. This arrangement consists of a regulator or control unit and the power unit. The regulator or control unit, designated CU, is that part of FIG. 1 enclosed in dotted lines, while the power unit consists of the rectifier GL, the inverter WR and the asynchronous motor M.

For the purpose of providing a signal to the control unit CU, coupled for rotation with the rotor shaft of the asynchronous motor M is a pulse generator 1. The pulses produced by the pulse generator 1 during operation of the asynchronous motor M are applied as a controlling input to the control unit CU over line 1a as an input to a counter 10 within the control unit CU.

The control unit CU includes computational logic circuits, such as an adder 2, subtracters 3 and 4, dividers 5 and 6, integrators 7 and 8, a speed regulator 9, the counter 10, a coordinate transformer 11 and a phase splitter 12. With the aid of the data taken from the rating plate, the rating plate data, and the parameters calculated therefrom, are fed to these components of the control unit, which are interconnected as shown in FIG. 1. Only the actual speed of the motor M is derived as a controlled variable from the signal of the pulse generator 1, namely by counting, in the counter 10, the pulses from the pulse generator 1 during a given unit of time and calculating, in the control unit CU, the actual speed from the count. The output $W_M$ of the counter 10, when compared with the rated speed $n_n$, provides a quantity $\omega$, which is representative of the slip frequency of the motor in operation. This comparison is effected at the subtracter 4, which provides an input to the speed regulator 9 indictive of the actual slip frequency of the motor M.

The unknown quantities required for operation of the system are calculated in the regulator or control unit CU. In equation (1) given above, the magnetizing current component $i_d$ and the rotor time constant $T_R$ are the parameters determinable from the motor data. By this equation (1), the unknown magnetizing current quantity $|i_{mR}|$ can thus be calculated.

This is done in the subtracter 3 and the integrator 7, where the output magnetizing current quantity $|i_{mR}|$ is derived from the input quantities, the magnetizing current component $i_d$ and the rotor time constant $T_R$. The magnetizing current component $i_d$ fed to the transformer 11 is sensed via lead 3a at the subtracter 3, which receives a feedback signal from the output of the integrator 7, the output of which is proportional to the magnetizing current component $|i_{mR}|$.

In equation (2), the magnetizing current $|i_{mR}|$ [calculated by equation (1)] and the value $M_a/K$ are known, so that the torque determining current component $i_q$ can be calculated by equation (2). $M_a$ is a torque command derived by the speed regulator 9 and K is a motor-dependent constant. In the arrangement shown, the constant K need not explicitly be communicated as a separate parameter to the control unit CU because the frequency converter is operated with speed control. The speed regulator 9 supplies the composite value $M_a/K$, i.e., the unknown quantity K is entered by adjusting the regulator parameters and combined with the regulator gain. The output of the speed regulator 9, which is $M_a/K$ is then divided in divider 6 by the magnetizing current $|i_{mR}|$ from lead 7a to provide an output on lead 6a which is the torque determining current $i_q$, which effectively implements equation 2.

A number $\omega_m \cdot p$ representing the rotor frequency is obtained by multiplying the number of pole pairs p by $\omega_m$ at the output of the counter 10, and this number is added to a value $\omega_2$ representative of the motor slip frequency at adder 2 to obtain a value $\omega_1$ representing the motor stator field frequency, the value $\omega_2$ being obtained by dividing at divider 5 the torque determining current component $i_q$ by the product of the rotor time constant $T_R$ and the magnetizing current $|i_{mR}|$.

Figure 2:
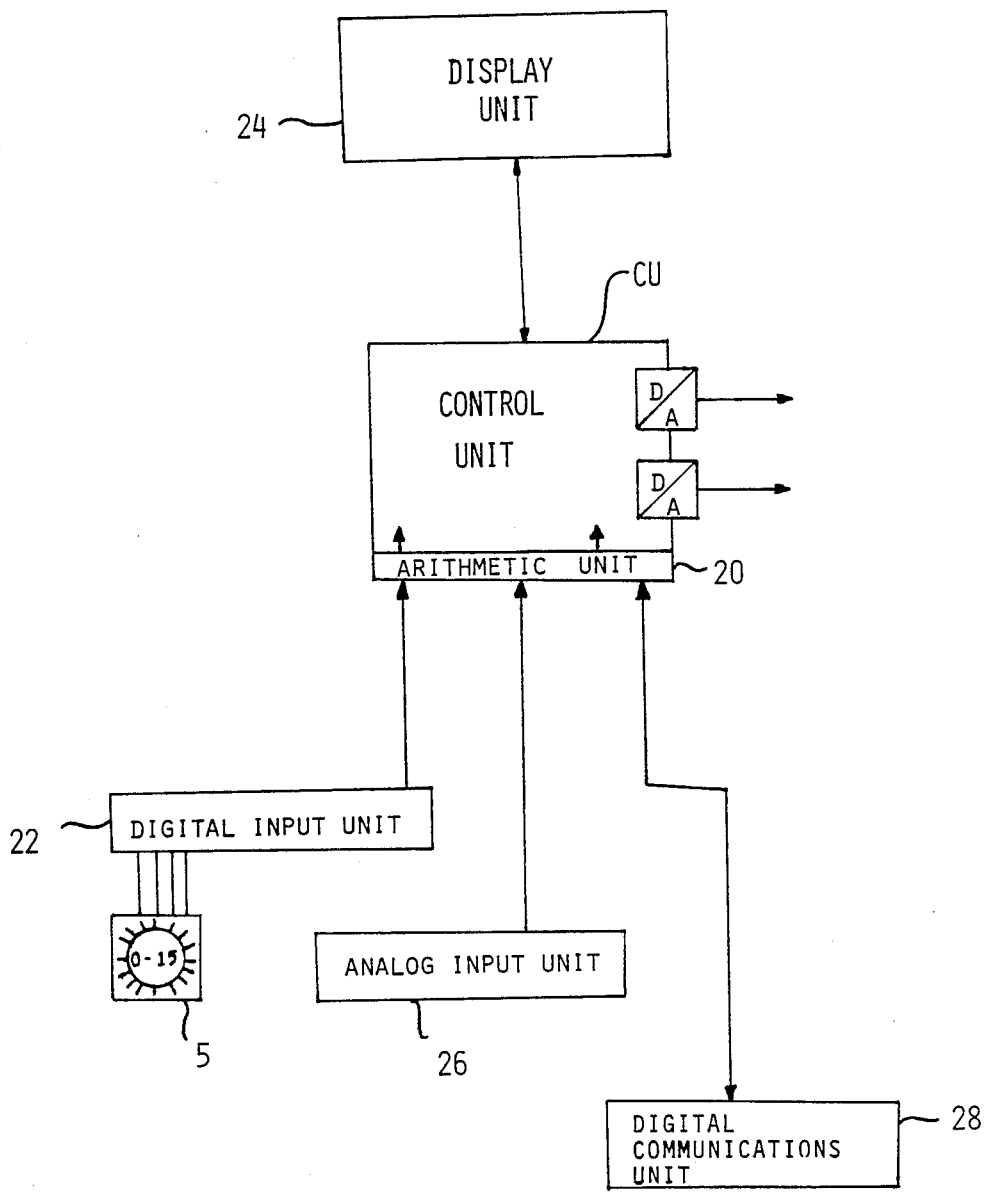
FIG. 2 is a block diagram of the control unit with some input units and a display unit.

FIG. 2 shows the units which cooperate with the control unit CU in carrying out the method in accordance with the invention. A part of the control unit CU is the arithmetic unit 20, to which preselected data are fed from a digital input unit 22. These data, i.e. the data given on the rating plate of the asynchronous motor, to wit, the rated current, the rated speed and the cosine value, are generated by any convenient method, such as the use of a corresponding number of stepping switches S in the digital input unit 22. Each stepping switch has sixteen steps, for example, and is connected to the digital input unit 22 by four lines. Each switch position is assigned a binary number which is representative of a datum stored in the digital input unit, e.g., a given actual speed. If this given binary number is set with switch S, the digital input unit 22 will feed the corresponding datum to the arithmetic unit 20, which will calculate the corresponding parameter. This datum is shown simultaneously on a display unit 24, operatively coupled to the control unit CU, which display 24 may be a liquid crystal display.

Apart from the digital input unit 22, through which the rating plate data or data directly derivable therefrom can be fed into the control unit CU and the arithmetic unit 20, other units, e.g., an analog input unit 26 or a digital communication unit 28, may cooperate with the control unit CU. The digital communication unit 28 is not a unit which feeds particular manually selected data to the control unit, but a unit which permits digital communication with higher-level computer systems (data input and data output are controlled by commands from the higher-level computer system).

Figure 3:
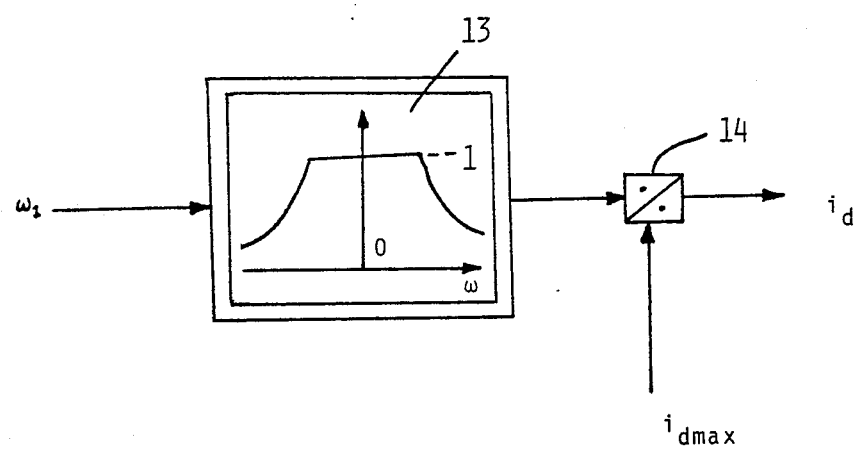
FIG. 3 is an addition to the arrangement of FIG. 1.

FIG. 3 shows a unit which supplements the control unit CU of FIG. 1 in such a way that the asynchronous motor M can also be controllable operated with field weakening, i.e., at a speed above the rated speed, without the frequency converter being overloaded.

The unit of FIG. 3 is inserted in the control unit CU of FIG. 1 at the point where $i_d$ is applied. It consists of a nonlinear function generator 13, e.g., a table stored in the arithmetic unit 20, having its output connected to a multiplier 14, in which the normalized output signal of the nonlinear function generator 13 is multiplied by the parameter derived from the motor data, i.e., the parameter $i_{dmax}$. The product is the longitudinal component of the primary-current vector for controlling the magnetizing-current vector. $\omega_1$ is the sum-angle frequency belonging to the rotor flux vector.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A control system for controlling an asynchronous motor which is fed by a frequency converter, by feeding to the motor a primary current vector formed of two components and a stator signal based on the stator frequency of the motor $\omega_1$, one of the components $i_q$ determining only the torque of the motor and the other of the components $i_d$ determining only the magnetic flux of the motor given with respect to its maximum value, the motor having parameters of operation expressed as rotor motor data including the rated speed of the motor $n_n$, the rated current of the motor $i_N$ and the angle value characteristic $\phi_N$ of the motor, the control system comprising a computer unit, comprising:
    input means for inputting thereto the rated speed of the motor $n_n$, the rated current $i_N$ of the motor and $\cos \phi_N$, and the actual speed of the motor $\omega_m$;
    means for calculating a constant $\overline{K}_1$ based on $\cos \phi_N$;
    means for determining the rated slip frequency of the motor $\omega_{2N}$ based on the inputted rated speed of the motor $n_n$;
    means for determining the rotor time constant of the motor $T_R$ by dividing the constant $\overline{K}_1$ by the rated slip frequency $\omega_{2N}$;
    means for determining the number of pole piars of the motor p based on the rated speed of the motor $n_n$ and an assumed slip rate of less than 10%;
    means for determining a value representing the rotor frequency of the motor by multiplying the number of pole pairs p by the actual speed of the motor $\omega_m$;
    means for determining the value of $i_d$ by multiplying the rated motor current $i_N$ by a value representing $\sin \phi_N$ calculated from $\cos \phi_N$;
    means for determining the value of $i_q$ based on the value of $i_d$, the rated speed of the motor $n_n$ and the actual speed of the motor $\omega_m$;
    means for forming the slip frequency $\omega_2$ based on the rotor time constant of the motor, the value of $i_d$ and the value of $i_q$; and
    means for summing the rotor frequency and the slip frequency $\omega_2$ to obtain the stator frequency $\omega_1$.

2. A system as in claim 1, wherein said means for forming the slip frequency $\omega_2$ comprises: means for determining the product of the magnetizing current $|i_{mR}|$ and the rotor time constant of the motor $T_R$ by calculating a solution to the equation $i_d = T_R d/dt \cdot (|i_{mR}|) + (i_{mR})$; and means for dividing the value of $i_q$ by the product of the magnetizing current $|i_{mR}|$ and the rotor time constant of the motor $T_R$ to obtain the slip frequency $\omega_2$.

3. A system as in claim 2, wherein said means for determining the value of $i_q$ comprises means for subtracting the actual motor speed $\omega_m$ from the rated speed $n_n$ to obtain a value representative of the slip frequency of the motor, a speed regulator means for calculating a composite value equal to the product of $i_d$ and $|i_{mR}|$, and divider means for dividing the composite value by the value of $|i_{mR}|$ to obtain the value of $i_q$.

4. A system as in claim 1, further comprising means for integrating the value of the stator frequency $\omega_1$ over time to obtain a value representative of the stator signal.

5. A system as defined in claim 1 further comprising display means for displaying such values.

6. A system as defined in claim 5 wherein said means for inputting comprise an analog input unit and a digital input unit for inputting the rated motor values or parameters.

* * * * *